Aug. 8, 1961     H. RIPPER     2,995,136
COMBINED CASE AND MIRROR FOR MAKE-UP STICK
Filed April 9, 1958     2 Sheets-Sheet 1

Inventor:
Hugo Ripper
by: Michael S. Striker
Attorney

Aug. 8, 1961  H. RIPPER  2,995,136
COMBINED CASE AND MIRROR FOR MAKE-UP STICK
Filed April 9, 1958  2 Sheets-Sheet 2

Inventor:
Hugo Ripper
by:
Michael S. Striker
Attorney 2,995,136
COMBINED CASE AND MIRROR FOR
MAKE-UP STICK
Hugo Ripper, 23 Blvd. des Capucines, Paris, France
Filed Apr. 9, 1958, Ser. No. 727,460
Claims priority, application France June 24, 1957
2 Claims. (Cl. 132—79)

The present invention relates to a combined case and mirror for a stick of make-up material, the two elements being combined in such a manner that they are handy to use even if held in one hand only. This combined case and mirror has the characteristic that it can be opened without its being necessary to withdraw the stick of lipstick material, thus making it possible, more particularly, to examine one's make-up discreetly.

The invention consists in mounting a small mirror fixedly on a folding shutter on a lipstick case or the like, a hinge spring being so arranged as to tend continually to open the said shutter, and a system of locking the said shutter in the closed position being so arranged that it can be released by pressing on a button, independent of the lipstick.

This button will preferably be arranged at the end of the case opposite to that at which the lipstick is pulled out.

In one particular form of embodiment, the pivot pin of the mirror is so arranged that when the latter is open it is in a position guaranteeing very good visibility and easy holding in the hand.

The pivot pin of the mirror and the position thereof are so arranged that the plane of the mirror in the opened position passes substantially through the axis of the tube containing the stick of make-up material.

Preferably the pivot pin of the mirror is carried by a plate fixed on the case in a position substantially perpendicular to the surface thereof, that is to say such that its plane passes through the axis of the case, the said pivot pin being spaced at such a distance from the case that in the closed position it is tangential to the case at its median portion.

By way of example and in order to facilitate the understanding of the description, in the accompanying drawings.

Figure 1:
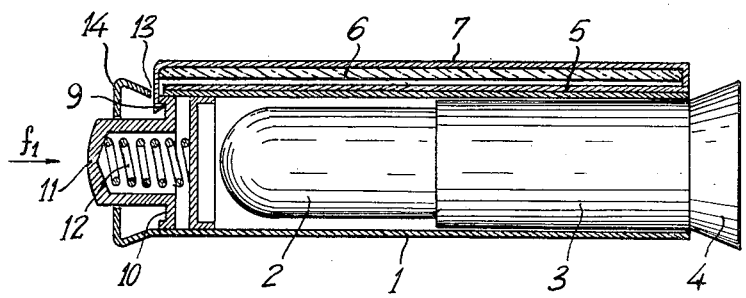
FIGURES 1 and 2 are a longitudinal sectional view and end view of a first form of embodiment.
Figure 2:
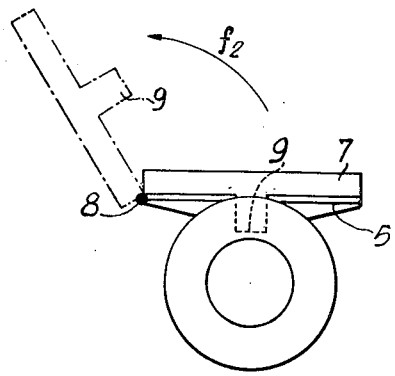

In the example illustrated in FIGURES 1 and 2, this devices comprises a cylindrical case 1 into which is introduced a stick of lipstick material 2 carried by a supporting sleeve 3 which terminates in a ring 4 on which the user can grip. Fixed on the side of the case 1 is a support plate 5 on which is pivotally mounted a shutter 7 on the inner face of which the oblong mirror 6 is fixed. The shutter 7 is pivotable by rotating about a pin 8 provided with a spring so arranged as to urge the said shutter continually into the open position.

This shutter 7 is provided laterally with a lug 9 terminating in a hook adapted to engage in the groove 10 of a push-button 11 against which a spring 12 bears. In order to come into engagement with the groove 10, the lug 9 extends through an aperture 13 formed in the closed end wall 14 of the case 1.

It will thus be seen that, in order to open the mirror, it is sufficient to exert a slight pressure in the direction of the arrow $f_1$ on the button 11, without having to pull out the stick of lipstick material. When the button is pushed inwards it releases the hook and the shutter carrying the mirror, urged by its spring, opens instantly, rotating in the direction of the arrow $f_2$ as indicated in FIG. 2.

It will be noted that as a result of the arrangement of the opening button 11 and the end of the case, and of the position occupied by the mirror when the shutter is in the opened position, the device can be manipulated by one hand, the mirror being in the handiest position for viewing as soon as it is opened.

Figure 3:
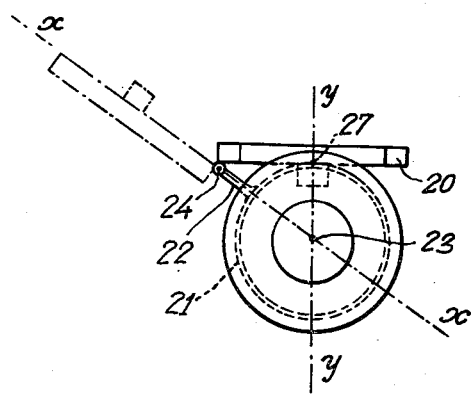
FIGURES 3 and 4 are respectively an end view and front view of a second form of embodiment.
Figure 4:
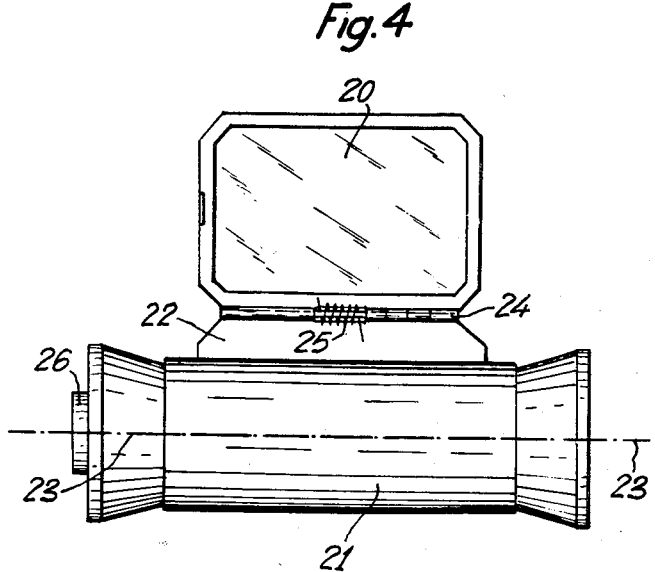

In the example illustrated in FIGURES 3 and 4, the mirror is opened by means of the same system as in FIGURES 1 and 2 and, for this reason, this system has not been shown again in FIGURES 3 and 4. The mirror 20 is here mounted on a case 21 containing the stick of make-up material, by means of a support plate 22 which is arranged in a plane $x$—$x$ perpendicular to the surface of the case, that is to say passing through its axis 23. This articulation 24 is of the hinge type comprising a spring 25 which ensures automatic opening as soon as the locking hook 26 is liberated. The particular arrangement of this locking system is that described in the example illustrated in FIGURES 1 and 2 and it is unnecessary to repeat this description here.

The distance of the pin 24 from the axis 23 is preferably so chosen that when the mirror is swung over into the closed position it is substantially tangential to the case in its median portion, that is to say in a position of symmetry relatively to the axial plane $y$—$y$ passing through the tangent 27.

This arrangement makes this device particularly handy to use.

The invention is independent of the more or less plastic or decorative forms which may be given to the various elements constituting the said invention (mirror, tube, case, end buttons) the particular appearence of which may vary infinitely.

I claim:

1. A compact comprising, in combination, an elongated casing having a longitudinal axis and being open at one end and adapted to have a lipstick insertable in said casing through said open end with the free end of the lipstick spaced from the other end of the casing; mirror means outside said casing and mounted thereon tiltable about an axis substantially parallel to the longitudinal axis of said casing between a closed position in which said mirror means abuts against said casing and an open position in which said mirror means projects angularly therefrom; spring means permanently tending to move said mirror means from said closed to said open position; and locking means mounted at said other end of said casing spaced from said free end of said lipstick for locking said mirror means in the closed position thereof, said locking means being movable independent of the position of said lipstick between a locking position in which said locking means locks said mirror means in said closed position and a releasing position in which said locking means releases said mirror means so that the latter will be turned by said spring means to said open position thereof, said locking means including a latch mounted on said mirror means, a button mounted on said other end of said casing coaxial therewith and movable in longitudinal direction thereof and having a portion engaging said latch, abutment means fixedly mounted in said casing adjacent the other end thereof and spaced from the free end of the lipstick if the same is inserted in said casing, and spring means also coaxial with said casing and abutting with opposite ends thereof respectively against said button and said abutment means for holding said portion of said button in engagement with said latch, said lipstick being movable in and out of said open end of said casing independent of the position of said mirror means.

2. A compact comprising, in combination, an elongated cylindrical casing open at one end thereof and adapted to have a lipstick insertable in said casing through said open end with the free end of the lipstick spaced from the other end of the casing; mirror means located outside said casing and tiltable between a closed position in which said mirror means abuts against said casing and an open position in which said mirror means projects angularly therefrom; hinge means fixed to said casing and supporting said mirror means turnable about an axis spaced from the outer surface of said casing and parallel to the axis thereof so that in said closed position said mirror means will be tangent to the outer surface of said casing and so that said mirror means extends in the open position thereof substantially in a plane passing through the center line of said cylindrical casing; spring means permanently tending to move said mirror means from said closed to said open position; and locking means mounted at said other end of said casing spaced from said free end of said lipstick for locking said mirror means in the closed position thereof, said locking means including a button mounted on said other end of said casing coaxial therewith and movable in longitudinal direction thereof independent of the position of said lipstick between a locking position in which said locking means locks said mirror means in said closed position and a releasing position in which said locking means releases said mirror means so that the latter will be turned by said spring means to said open position thereof, said lipstick being movable in and out of said open end of said casing independent of the position of said mirror means.

References Cited in the file of this patent

UNITED STATES PATENTS

| | | |
|---|---|---|
| 1,632,864 | Weber | June 21, 1927 |
| 1,782,024 | Aronson | Nov. 18, 1930 |
| 2,294,656 | Feib | Sept. 1, 1942 |
| 2,466,783 | Sarff | Apr. 12, 1949 |
| 2,547,971 | Polin | Apr. 10, 1951 |
| 2,720,884 | Fritz | Oct. 18, 1955 |
| 2,830,602 | Levi | Apr. 15, 1958 |

FOREIGN PATENTS

| | | |
|---|---|---|
| 1,008,982 | France | Feb. 27, 1952 |